(12) United States Patent
Kurashima (10) Patent No.: US 10,613,280 B2
(45) Date of Patent: Apr. 7, 2020

(54) OPTICAL RECEPTACLE, FIBER STUB, AND OPTICAL MODULE THAT ATTENUATE ELECTROMAGNETIC WAVES

(71) Applicant: Sumitomo Electric Industries, Ltd., Osaka-shi (JP)

(72) Inventor: Hiromi Kurashima, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 16/026,394

(22) Filed: Jul. 3, 2018

(65) Prior Publication Data

US 2019/0011649 A1    Jan. 10, 2019

(30) Foreign Application Priority Data

Jul. 5, 2017   (JP) ................................ 2017-131963

(51) Int. Cl.
    *G02B 6/42* (2006.01)

(52) U.S. Cl.
    CPC ........... *G02B 6/421* (2013.01); *G02B 6/4256* (2013.01); *G02B 6/4279* (2013.01); *G02B 6/4292* (2013.01); *G02B 6/4206* (2013.01); *G02B 6/4207* (2013.01); *G02B 6/4239* (2013.01)

(58) Field of Classification Search
    CPC ..... G02B 6/421; G02B 6/4206; G02B 6/4256
    See application file for complete search history.

(56) References Cited

U.S. PATENT DOCUMENTS

| 7,322,752 | B2 * | 1/2008 | Endou | G02B 6/4206 385/88 |
|---|---|---|---|---|
| 2003/0128937 | A1 * | 7/2003 | Sato | G02B 6/4204 385/78 |
| 2003/0169978 | A1 * | 9/2003 | Sato | G02B 6/3846 385/88 |
| 2003/0231833 | A1 * | 12/2003 | Lerner | G02B 6/4214 385/49 |
| 2005/0013552 | A1 * | 1/2005 | Chien | G02B 6/4219 385/88 |
| 2011/0008000 | A1 * | 1/2011 | Tokushima | B82Y 20/00 385/21 |

FOREIGN PATENT DOCUMENTS

| JP | 2006-106680 A | 4/2006 |
|---|---|---|
| JP | 2008-151956 A | 7/2008 |
| JP | 2013-050512 A | 3/2013 |

\* cited by examiner

*Primary Examiner* — Akm E Ullah
(74) *Attorney, Agent, or Firm* — Baker Botts L.L.P.; Michael A. Sartori (57) ABSTRACT

An optical receptacle is disclosed. The optical receptacle includes a ferrule that includes an inner hole extending in a first direction and a distal end face having an opening in the inner hole, an optical fiber disposed in the inner hole, the optical fiber having a first end exposed from the opening, a metal member that includes a first through hole extending in the first direction and holds the ferrule in the first through hole, a metal body that includes a second thorough hole extending in the first direction and holds the metal member in the second thorough hole, a low dielectric constant material formed inside the ferrule and outside the optical fiber. The low dielectric constant material has a dielectric constant lower than a dielectric constant of the ferrule.

13 Claims, 10 Drawing Sheets

OPTICAL RECEPTACLE, FIBER STUB, AND OPTICAL MODULE THAT ATTENUATE ELECTROMAGNETIC WAVES

CROSS-REFERENCE TO RELATED APPLICATION

The present application claims the benefit of priority to Japanese Patent Application No. 2017-131963, filed on Jul. 5, 2017, the content of which is incorporated herein by reference in its entirety.

TECHNICAL FIELD

The present invention relates to an optical receptacle, a fiber stub, and an optical module.

BACKGROUND

Japanese Unexamined Patent Publication No. JP2006-106680 discloses an optical module having an optical receptacle structure. The optical module includes a stub ferrule (fiber stub), a sleeve, a holder, and an adapter. The stub ferrule guides laser light to an optical fiber connected to the optical module. The sleeve holds the stub ferrule and an optical connector ferrule of the optical fiber connected to the optical module. The holder holds the stub ferrule and the sleeve fixed thereto. The adapter connects the holder with the optical module. Japanese Unexamined Patent Publication No. JP2008-151956 discloses an exemplary optical adapter. Japanese Unexamined Patent Publication No. JP 2013-50512 discloses an exemplary optical transceiver.

SUMMARY OF THE INVENTION

An aspect of the present disclosure provides an optical receptacle. The optical receptacle comprises a ferrule that includes an inner hole extending in a first direction and a distal end face having an opening of the inner hole; an optical fiber disposed in the inner hole, the optical fiber having a first end exposed from the opening; a metal member that includes a first through hole extending in the first direction and holds the ferrule in the first through hole; a metal body that includes a second through hole extending in the first direction and holds the metal member in the second through hole; and a low dielectric constant material formed inside the ferrule and outside the optical fiber, the low dielectric constant material having a dielectric constant lower than a dielectric constant of the ferrule.

An aspect of the present disclosure provides a fiber stub. The fiber stub comprises a ferrule that includes an inner hole extending in a first direction and a distal end face having an opening of the inner hole; an optical fiber disposed in the inner hole, the optical fiber having a first end exposed from the opening; and a low dielectric constant material formed inside the ferrule and outside the optical fiber, the low dielectric constant material having a dielectric constant lower than a dielectric constant of the ferrule.

An aspect of the present disclosure provides an optical module. The optical module comprises the above-described optical receptacle; an optical device that optically couples with a second end of the optical fiber; a lens disposed in an optical path between the second end of the optical fiber and the optical device; and a package attached to at least one of the metal member or the metal body, the package housing the optical device and the lens therein.

BRIEF DESCRIPTION OF THE DRAWINGS

The foregoing and other purposes, aspects and advantages will be better understood from the following detailed description of embodiments of the invention with reference to the drawings, in which.

DETAILED DESCRIPTION OF THE INVENTION

Problems to be Solved by the Disclosure

An optical module for use in an optical communication system includes an optical receptacle and an optical device. The optical receptacle is connected with an optical connector disposed at a distal end of an optical fiber. The optical device is, for example, a light-emitting element or a light-receiving element. The optical receptacle includes a fiber stub that achieves a physical contact with an optical connector ferrule. The physical contact is a technique in which distal end faces of the cylindrical optical connector ferrule, through which the optical fiber is passed, and the fiber stub including an optical fiber end face are spherically polished and the optical connector ferrule and the fiber stub are mutually brought into abutment to thereby generate a high stress field (Hertzian stress) at the abutment portion and to eliminate a gap between the optical fiber end faces. The technique can prevent return light from an abutment portion to the light-emitting element and reduce loss caused by reflection at the optical connector connection.

Ceramic (e.g., zirconia) as a dielectric is typically used for the material of the fiber stub. Thus, the fiber stub serves as a path which transmits electromagnetic waves from the inside to the outside of an optical module, whereby the electromagnetic compatibility (EMC) of the optical module can degrade. One possible phenomenon that can occur is that electromagnetic waves generated by a high-speed electric signal in the optical module pass through the fiber stub, while being attenuated, and are radiated outside the optical module. Such a phenomenon is considered to tend to occur at higher electric signal speeds, such as when the communication rate of the electric signal exceeds 25 Gbps.

Effects of the Disclosure

With the present disclosure, degradation of electromagnetic compatibility caused by the fiber stub can be reduced.

DESCRIPTION OF EMBODIMENTS

The following first lists details of embodiments in the present invention. In one embodiment, an optical receptacle comprises a ferrule that includes an inner hole extending in a first direction and a distal end face having an opening in the inner hole; an optical fiber disposed in the inner hole, the optical fiber having a first end exposed from the opening; a metal member that includes a first through hole extending in the first direction and holds the ferrule in the first through hole; a metal body that includes a second through hole extending in the first direction and holds the metal member in the second through hole; and a low dielectric constant material formed inside the ferrule and outside the optical fiber, the low dielectric constant material having a dielectric constant lower than a dielectric constant of the ferrule.

In general, an optical receptacle includes a fiber stub having a structure in which the ferrule holds the optical fiber therein. The optical receptacle further includes a structure in which the metal member holds the fiber stub in the through hole thereof. Such a structure of the optical receptacle can be regarded as a cylindrical waveguide including composite dielectrics (ferrule and optical fiber) filling the through hole in the metal member. The waveguide has a cutoff frequency and cuts off electromagnetic waves having frequencies equal to or lower than the cutoff frequency. A high dielectric constant of the dielectric material filling the waveguide decreases the cutoff frequency, so that the electromagnetic waves having high frequencies tend to pass through the waveguide. Zirconia has a particularly high relative permittivity of 33 to 46, about ten times higher than a relative permittivity of 3.8 of quartz. This is a factor that decreases the cutoff frequency of the cylindrical waveguide.

To solve such a problem, the optical receptacle described above includes the low dielectric constant material formed inside the ferrule and outside the optical fiber. The ferrule has the distal end face to make a physical contact with the optical connector ferrule. For this reason, a material having a high toughness and high Young's modulus (e.g., zirconia as a high dielectric constant material) is used as the material for the ferrule. The low dielectric constant material has a dielectric constant lower than the dielectric constant of the ferrule. Examples of the low dielectric constant materials include, but are not limited to, a resin. The cutoff frequency of the waveguide formed by the metal member that holds the ferrule is thus increased by the low dielectric constant material, so that the electromagnetic waves having high frequencies are difficult to pass through the waveguide formed by the metal member that holds the ferrule. Specifically, with the optical receptacle described above having the foregoing waveguide structure, the degradation of the electromagnetic compatibility can be reduced.

In the optical receptacle, the ferrule may further include a proximal end face opposite to the distal end face in the first direction and a bore formed in the proximal end face. The low dielectric constant material may be disposed in the bore. This configuration enables easy manufacturing of an optical receptacle having the low dielectric constant material formed inside the ferrule. The bore outside the optical fiber may be filled with the low dielectric constant material. In this case, the inner hole of the ferrule may run through from a bottom of the bore to the distal end face of the ferrule.

In the optical receptacle, the ferrule may include a taper as a portion of the bore, and the taper has an inner diameter gradually decreasing toward the bottom of the bore. The ferrule may include a main hole as another portion of the bore, the main hole has a round columnar shape, and the main hole may extend from the proximal end face to the taper. The ferrule may be press-fitted in the first through hole in the first direction, and the bore has a bottom located closer to the distal end face than an end, closer to the distal end face, of a contact range between the ferrule and the first through hole in the first direction. This arrangement enables electromagnetic waves having high frequencies to be effectively shielded, while maintaining a sufficient strength for a portion of the ferrule press-fitted in the metal member. The bore can thus be made even deeper. The dielectric constant inside the through hole in the metal member can thus be reduced while the strength of the ferrule can be prevented from being reduced, so that the electromagnetic waves having high frequencies can be effectively shielded.

In the optical receptacle, the bore may have an inner diameter that is 0.5 times or less an outer diameter of the ferrule. The bore may have the inner diameter that is 0.4 times or more an outer diameter of the ferrule. According to finding of the inventor, when such a relation holds between the inner diameter of the bore and the outer diameter of the ferrule, the electromagnetic waves having frequencies close to 25 GHz used for high speed optical communication and higher can be effectively shielded.

In the optical receptacle, the ferrule may be formed of zirconia and the low dielectric constant material may be formed of a resin. This configuration can favorably achieve both the ferrule that makes a physical contact with the optical connector ferrule and the low dielectric constant material for increasing the cutoff frequency of the waveguide by reducing the dielectric constant inside the through hole in the metal member. The low dielectric constant material may include an epoxy resin. In the optical receptacle, the proximal end face of the ferrule may be inclined with respect to a plane perpendicular to the first direction. The low dielectric constant material may have a certain relative permittivity so that the optical receptacle has a cutoff frequency more than 25 GHz.

In one embodiment, a fiber stub comprises a ferrule that includes an inner hole extending in a first direction and a distal end face having an opening of the inner hole; an optical fiber disposed in the inner hole, the optical fiber having a first end exposed from the opening; and a low dielectric constant material formed inside the ferrule and outside the optical fiber, the low dielectric constant having a dielectric constant lower than a dielectric constant of the ferrule. Similarly to the optical receptacle described above, with this fiber stub, the degradation of the electromagnetic compatibility caused by the fiber stub can be reduced.

In one embodiment, an optical module comprises the optical receptacle according to any of the above-described aspects; an optical device that optically couples with a second end of the optical fiber; a lens disposed in an optical path between the second end of the optical fiber and the optical device; and a package attached to at least one of the metal member or the metal body, the package housing the optical device and the lens therein. With the optical module including the optical receptacle described above, the degradation of the electromagnetic compatibility caused by the fiber stub can be reduced.

DETAILED DESCRIPTION OF EMBODIMENTS

The following describes, with reference to the accompanying drawings, specific examples of an optical receptacle, a fiber stub, and an optical module according to embodiments of the present invention. It should be noted that the present invention is not limited to the following exemplary embodiments and is intended to include all modifications indicated by the scope of the claims and falling within the meaning and scope of equivalents of the claims. In the description that follows, like reference numerals designate identical or corresponding components throughout the drawings and, once detailed, will not be elaborated upon any further.

Figure 1:
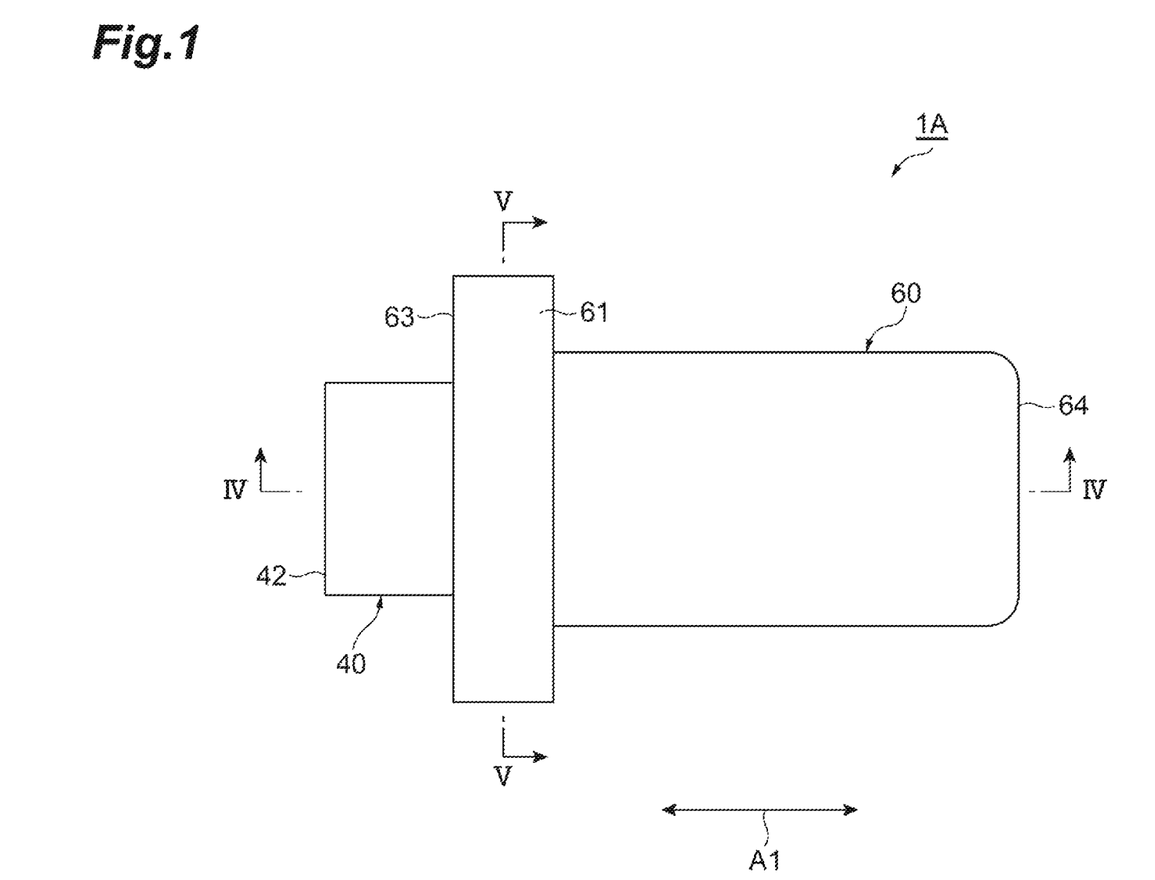
FIG. 1 is a side view illustrating an optical receptacle according to a first embodiment.
Figure 2:
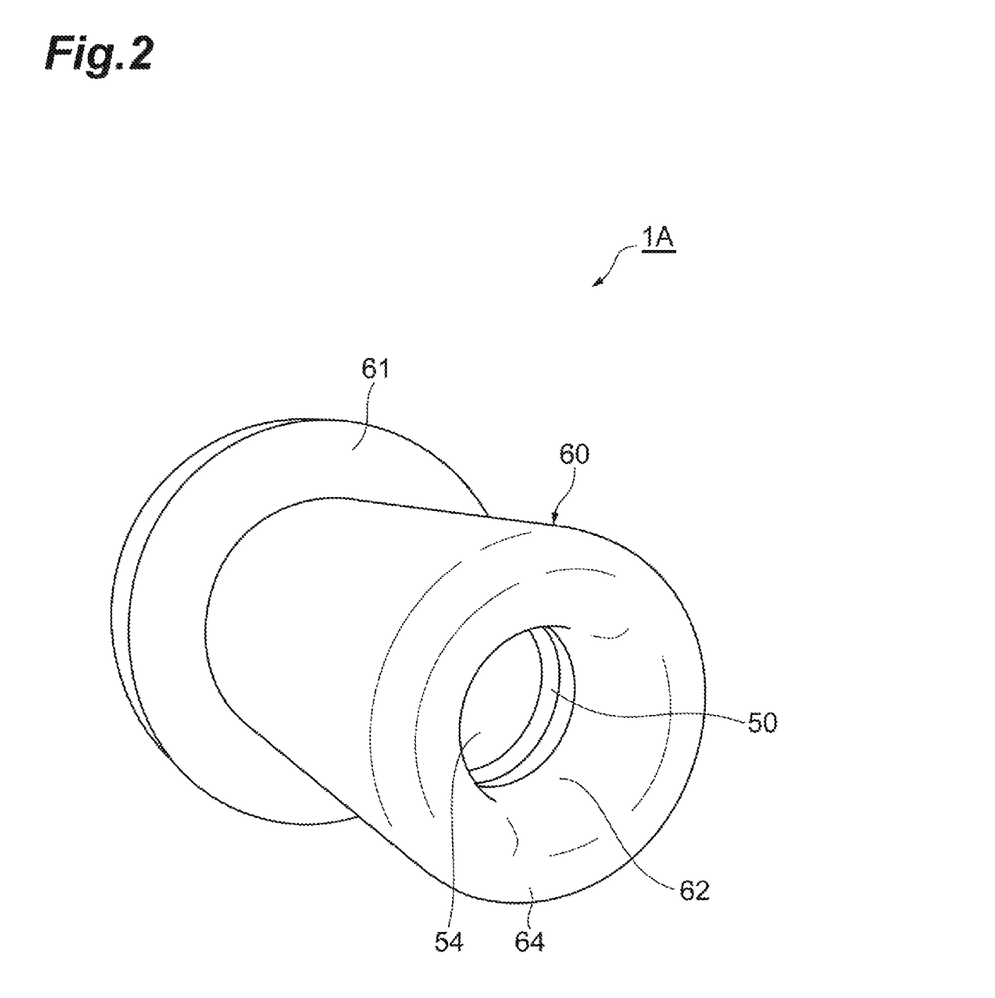
FIG. 2 is a perspective view illustrating the optical receptacle according to the first embodiment, as viewed from a front.
Figure 3:
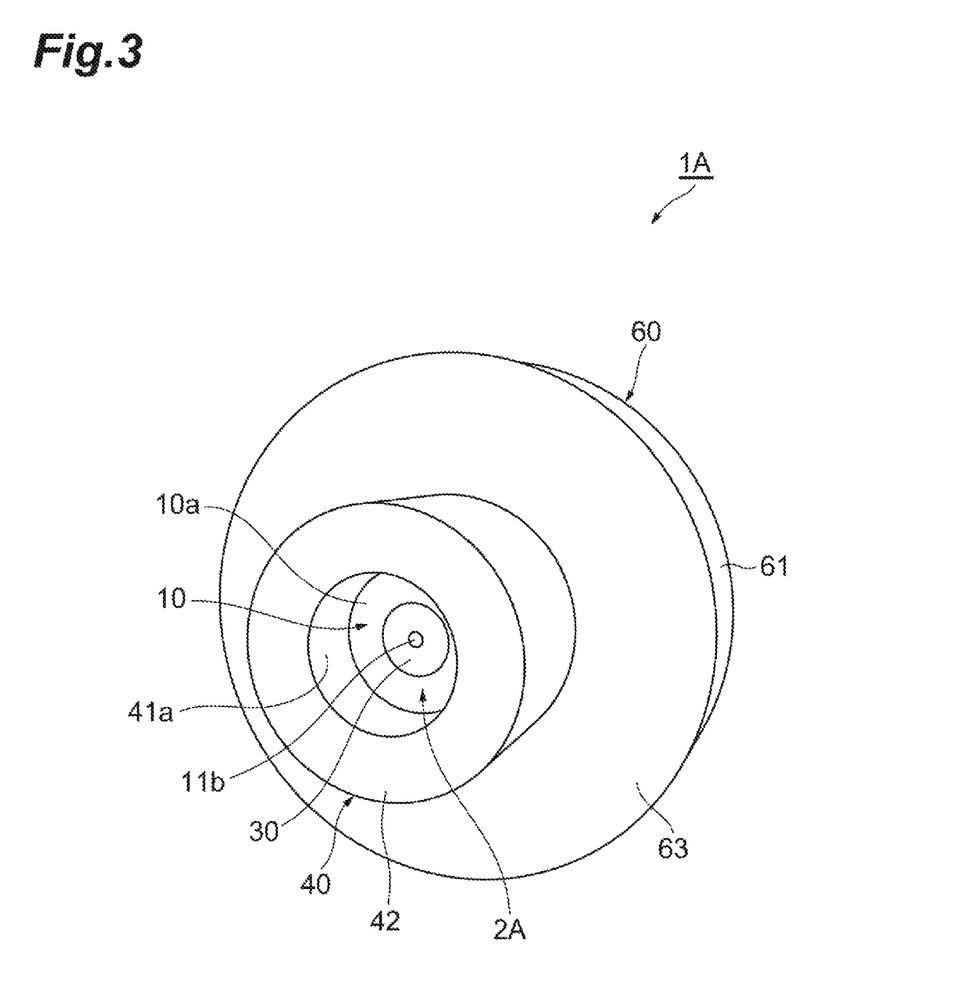
FIG. 3 is a perspective view illustrating the optical receptacle according to the first embodiment, as viewed from a rear.
Figure 4:
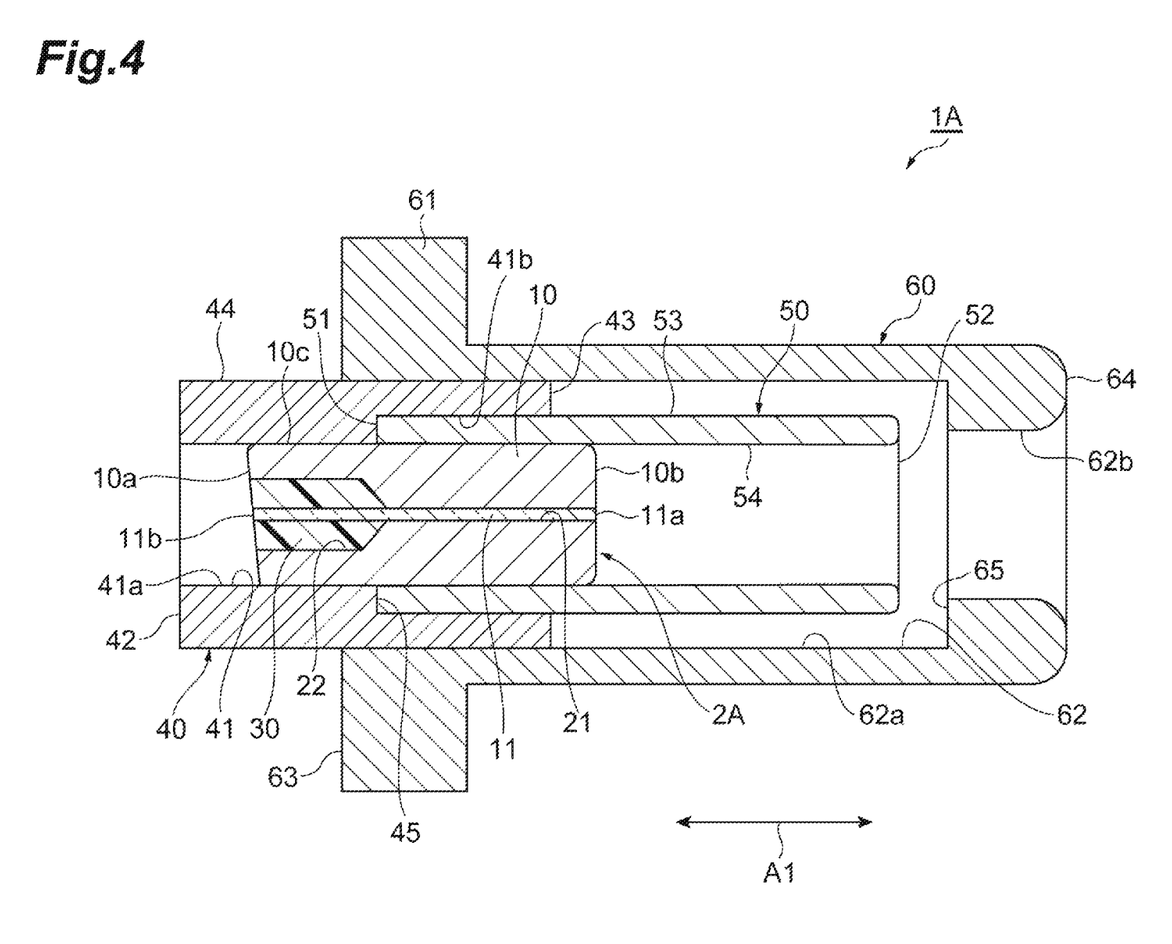
FIG. 4 is a sectional view illustrating the optical receptacle, taken along line IV-IV in FIG. 1.
Figure 5:
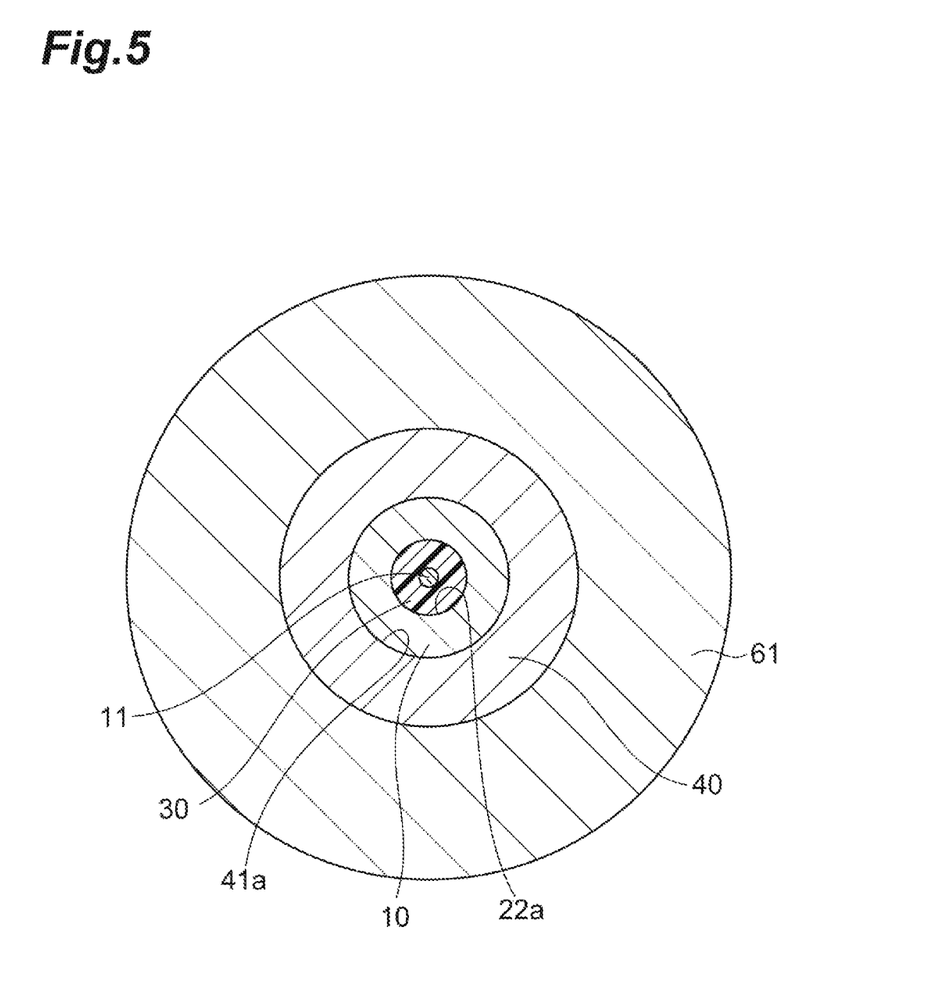
FIG. 5 is a cross-sectional view illustrating the optical receptacle, taken along line V-V in FIG. 1.

FIG. 1 is a side view illustrating an optical receptacle 1A according to a first embodiment. FIG. 2 is a perspective view illustrating the optical receptacle 1A, as viewed from a front. FIG. 3 is a perspective view illustrating the optical receptacle 1A, as viewed from a rear. FIG. 4 is a sectional view illustrating the optical receptacle 1A, taken along line IV-IV in FIG. 1. FIG. 5 is a cross-sectional view illustrating the optical receptacle 1A, taken along line V-V in FIG. 1. As illustrated in FIGS. 1 to 5, the optical receptacle 1A in the first embodiment includes a fiber stub (stub ferrule) 2A, a metal member 40, a sleeve 50, and a shell (metal body) 60. As illustrated in FIGS. 3 and 4, the fiber stub 2A includes a ferrule 10, an optical fiber 11, and a low dielectric constant material 30.

The ferrule 10 has a cylindrical shape (or round columnar shape). The ferrule 10 has a central axis lengthwise in a direction A1. The ferrule 10 has a circular cross section perpendicular to the central axis. The ferrule 10 has a proximal end face 10a and a distal end face 10b juxtaposed in the direction A1. The distal end face 10b achieves a physical contact with a ferrule of an optical connector to be connected to the optical receptacle 1A. The distal end face 10b is thus spherically polished, for example. The proximal end face 10a is disposed on a side opposite to the distal end face 10b. The proximal end face 10a faces an optical module on which the optical receptacle 1A is mounted. The proximal end face 10a is inclined slightly (e.g., about 8 degrees) with respect to a plane perpendicular to the central axis of the ferrule 10. The ferrule 10 further has an outer peripheral surface 10c as a round columnar surface.

The ferrule 10 further has an inner hole 21 that holds the optical fiber 11. The inner hole 21 is formed along the central axis of the ferrule 10 lengthwise in the direction A1. The inner hole 21 has a circular cross section having an inner diameter slightly greater than an outer diameter of the optical fiber 11. A first opening in the inner hole 21 is included in the distal end face 10b, while a second opening in the inner hole 21 is included in the proximal end face 10a. Specifically, the inner hole 21 runs through from the proximal end face 10a to the distal end face 10b of the ferrule 10 in the direction A1.

The optical fiber 11 is, for example, a single mode fiber and is a bare fiber not covered in a resin jacket. The optical fiber 11 is formed of, for example, quartz. The optical fiber 11 is lengthwise in the direction A1 as the longitudinal direction (optical axis direction). The optical fiber 11 has a first end 11a and a second end 11b. The optical fiber 11 is inserted in the inner hole 21 and has the first end 11a exposed from the first opening in the distal end face 10b of the inner hole 21 and the second end 11b exposed from the second opening in the proximal end face 10a of the inner hole 21. The first end 11a contacts with a distal end of an optical fiber of the optical connector to be connected to the optical receptacle 1A. The second end 11b optically couples to an optical component (e.g., light-emitting element or light-receiving element) built in the optical module on which the optical receptacle 1A is mounted. The optical fiber 11 has an outer diameter of 125 µm, for example.

Figure 6:
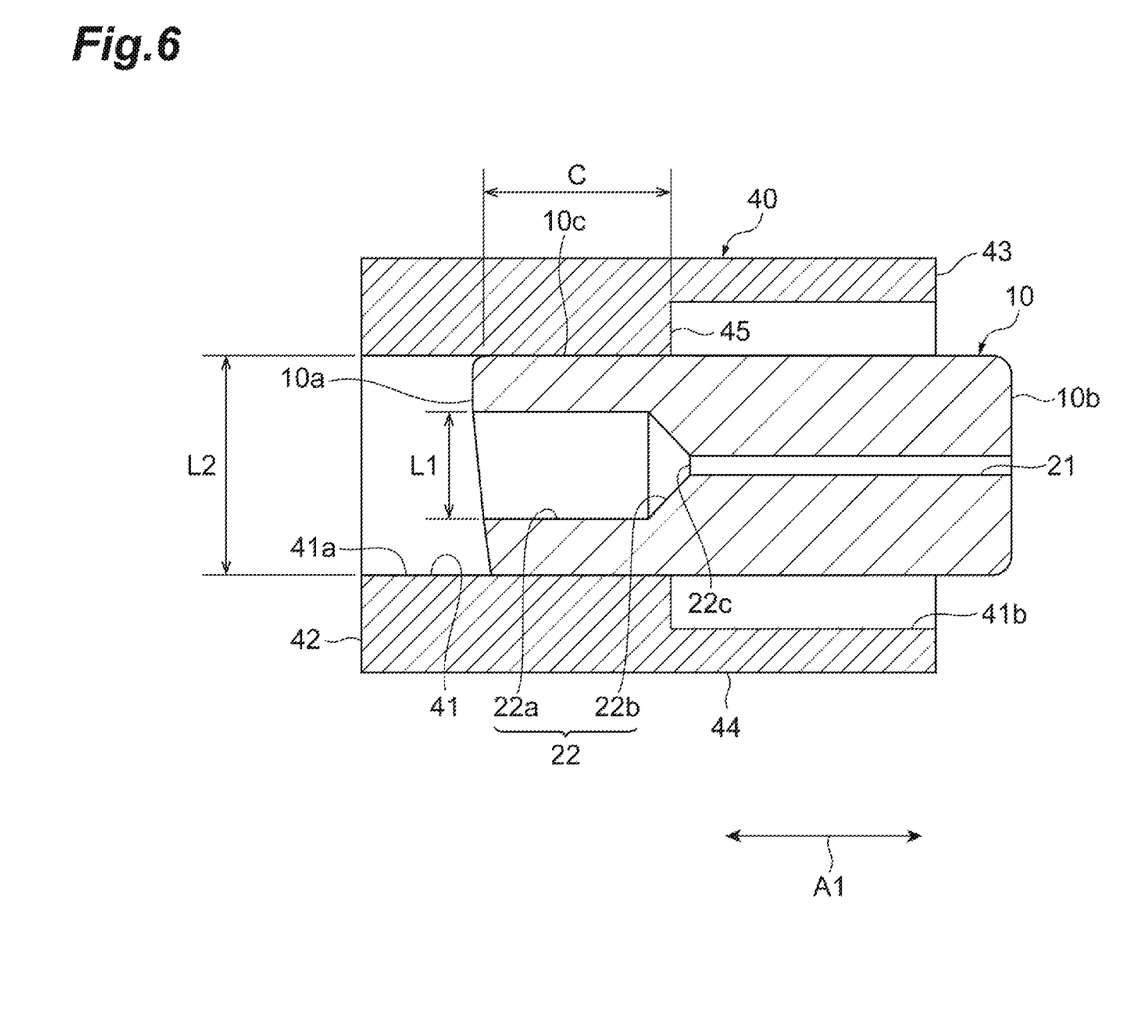
FIG. 6 is a sectional view illustrating a first region of a ferrule and a metal member.

The fiber stub 2A includes the low dielectric constant material 30 disposed inside the ferrule 10. FIG. 6 is a sectional view illustrating the ferrule 10 of the fiber stub 2A and the metal member 40. The ferrule 10 has at least the distal end face 10b; in the first embodiment, the ferrule 10 has the proximal end face 10a, the distal end face 10b, and the outer peripheral surface 10c. Specifically, the ferrule 10 has a round columnar shape as a solid as described previously, having the circular proximal end face 10a on a first end in a central axis direction (direction A1) and the circular distal end face 10b on a second end in the central axis direction. The proximal end face 10a is not be perpendicular to the central axis and is slightly inclined to prevent return light. The ferrule 10 is formed of, for example, zirconia ($ZrO_2$). The ferrule 10, being formed of the zirconia having a high toughness and high Young's modulus, enables a physical contact to be favorably achieved on the distal end face 10b. The ferrule 10 has a bore 22 formed in the proximal end face 10a. The bore 22 is formed so as to have a depth direction in the direction A1. The bore 22 has a circular cross section perpendicular to the direction A1. The bore 22 has a central axis aligned with the central axis of the ferrule 10.

The bore 22 includes a main part 22a and a taper 22b. The main part 22a has a round columnar shape extending from the proximal end face 10a in the direction A1. An inner diameter of the bore 22, specifically, an inner diameter L1 of the main part 22a is greater than an outer diameter of the optical fiber 11 and smaller than an outer diameter L2 of the ferrule 10. The inner diameter L1 of the main part 22a is, for example, 0.4 times or more to 0.5 times or less the outer diameter L2 of the ferrule 10. The outer diameter L2 of the ferrule 10 is, for example, 1.25 mm. The taper 22b is disposed between the main part 22a and, the distal end face 10b and the inner hole 21. The taper 22b has an inner diameter that gradually decreases from a connection with the main part 22a toward a bottom 22c of the bore 22. The bottom (specifically, an apex of the taper 22b) 22c of the bore 22 is disposed on the central axis of the ferrule 10. The inner hole 21 described previously runs through from the bottom 22c of the bore 22 to the distal end face 10b.

Reference is again made to FIGS. 1 to 5. The low dielectric constant material 30 has a dielectric constant lower than the dielectric constant of the ferrule 10. The ferrule 10, when formed of zirconia, has a relative permittivity of 38 to 40. Then, the relative permittivity of the low dielectric constant material 30 is set to be lower than the relative permittivity of the zirconia (e.g., equal to or lower than a relative permittivity of the optical fiber 11). The low dielectric constant material 30 is, for example, a resin and, in one embodiment, an epoxy resin. The low dielectric constant material 30 is filled in the bore 22 outside the optical fiber 11. To state the foregoing differently, the low dielectric constant material 30 is shaped substantially identically to the bore 22 and is in contact with an inner surface of the bore 22. The contact may be surface contact. Thus, the low dielectric constant material 30 has a substantially round columnar shape having a central axis in the direction A1.

The low dielectric constant material 30 includes part of the proximal end face 10a (portion around the central axis of the ferrule 10). The low dielectric constant material 30 in the first embodiment holds the optical fiber 11 extended from the inner hole 21 in the direction A1.

The metal member 40 has a through hole 41 lengthwise in the direction A1 and holds the fiber stub 2A in the through hole 41. The metal member 40 is formed of a metal material such as stainless steel. As illustrated in FIG. 3, the metal member 40 has a cylindrical shape extending in the direction A1. As illustrated in FIG. 6, the metal member 40 has a proximal end face 42, a distal end face 43, and an outer peripheral surface 44. The proximal end face 42 and the distal end face 43 are disposed in juxtaposition to each other in the direction A1. The through hole 41 runs through from the proximal end face 42 to the distal end face 43. The through hole 41 has a circular cross section perpendicular to the direction A1. The proximal end face 42 abuts on, for example, a housing of the optical module on which the optical receptacle 1A is mounted.

As illustrated in FIG. 6, the metal member 40 includes, as the through hole 41, a first portion 41a and a second portion 41b. The first portion 41a is adjacent to the proximal end face 42. The second portion 41b is adjacent to the distal end face 43. The first portion 41a extends from the proximal end face 42 in the direction A1 to a position near a center of the through hole 41. The second portion 41b extends from the distal end face 43 in the direction A1 to a position near the center of the through hole 41. The first portion 41a connects to (communicates with) the second portion 41b at the position near the center of the through hole 41. The first portion 41a has an inner diameter equal to or slightly smaller than the outer diameter L2 of the ferrule 10 described previously. An outline of the fiber stub 2A is determined based at least in part on the shape of the ferrule 10. Thus, the inner diameter of the first portion 41a is equal to or slightly smaller than the outer diameter L2 of the fiber stub 2A. The second portion 41b has an inner diameter greater than the outer diameter L2 of the ferrule 10. Because the outline of the fiber stub 2A is determined based at least in part on the shape of the ferrule 10, the inner diameter of the second portion 41b is greater than the outer diameter L2 of the fiber stub 2A. Because the inner diameter of the first portion 41a is smaller than the inner diameter of the second portion 41b as described above, a shoulder surface 45 is formed between the first portion 41a and the second portion 41b. The shoulder surface 45 is an annular surface surrounding the central axis of the ferrule 10 and intersects the direction A1. While the shoulder surface 45 is disposed near the center of the through hole 41 in FIG. 6, the arrangement is illustrative only and not limiting. The shoulder surface 45 may be disposed, for example, closer to the proximal end face 42 or the distal end face 43, depending on the shape of the optical receptacle 1A.

The fiber stub 2A is press-fitted in the first portion 41a of the through hole 41 in the metal member 40 in the direction A1. Specifically, the fiber stub 2A (ferrule 10) has the outer peripheral surface 10c in contact with an inner surface of the first portion 41a. The contact may be surface contact. With this configuration, the fiber stub 2A is fixed to the metal member 40. Specifically, part of the ferrule 10 close to the proximal end face 10a is press-fitted in the first portion 41a from the shoulder surface 45 toward the proximal end face 42. The proximal end face 10a is located inside the first portion 41a and a rest part proximal to the distal end face 10b of the ferrule 10 protrudes anteriorly from the shoulder surface 45 in the direction A1. The bottom 22c of the bore 22 is located to be closer to the distal end face 10b than an end (specifically, shoulder surface 45) closer to the distal end face 10b of a contact range (range C in FIG. 6) between the ferrule 10 and the through hole 41 in the direction A1. To state the foregoing differently, the low dielectric constant material 30 has a length in the direction A1 (distance between the proximal end face 10a and the bottom 22c of the bore 22) longer than the contact range C. The contact range C is, for example, 0.9 mm in length.

Reference is again made to FIGS. 1 to 5. The sleeve 50 is a cylindrical member extending in the direction A1 and is formed of, for example, ceramics. The sleeve 50 is formed of a material identical to the material used for the ferrule 10 (e.g., zirconia). The sleeve 50 has an inner diameter substantially identical to the outer diameter of the fiber stub 2A. The sleeve 50 has a proximal end 51 and a distal end 52 juxtaposed in the direction A1. The sleeve 50 has an outer peripheral surface 53 and an inner peripheral surface 54. The fiber stub 2A is inserted from an opening in the proximal end 51 of the sleeve 50. To state the foregoing differently, part of the sleeve 50 close to the proximal end 51 is inserted in a clearance between the outer peripheral surface 10c of the ferrule 10 and the second portion 41b of the through hole 41 in the metal member 40. Thus, the proximal end 51 of the sleeve 50 is in contact with the shoulder surface 45, the outer peripheral surface 53 of the sleeve 50 is in contact with the second portion 41b, and the inner peripheral surface 54 of the sleeve 50 is in contact with the outer peripheral surface 10c of the fiber stub 2A. The optical connector ferrule is inserted from an opening in the distal end 52 of the sleeve 50. The distal end face 10b of the fiber stub 2A contacts with a distal end face of the optical connector ferrule inside the sleeve 50. The contact allows optical coupling between the optical fiber 11 held by the ferrule 10 and an optical fiber held by the optical connector ferrule to provide high coupling efficiency.

The shell (metal body) 60 holds the metal member 40 and connects with the optical connector. The shell 60 has a cylindrical shape extending in the direction A1 and is formed of a metal material such as stainless steel. The shell 60 includes a flange 61 and has a through hole 62 lengthwise in the direction A1. The shell 60 has a proximal end face 63 and a distal end 64. The proximal end face 63 and the distal end 64 are in juxtaposition to each other in the direction A1. The flange 61 is a disc-shaped portion protruding outwardly from the shell 60. The flange 61 is disposed adjacent to the proximal end face 63 of the shell 60. A first face of the flange 61 constitutes the proximal end face 63. The through hole 62 runs through from the proximal end face 63 to the distal end 64. The through hole 62 has a circular cross section perpendicular to the direction A1. The central axis of the through hole 62 overlaps the central axes of the fiber stub 2A and the metal member 40. The shell 60 includes, as part of the through hole 62, a first portion 62a and a second portion 62b. The first portion 62a extends from the proximal end face 63 toward the distal end 64. The second portion 62b is adjacent to the distal end 64. The first portion 62a extends from the proximal end face 63 in the direction A1 toward a position near the distal end 64. The second portion 62b extends from the distal end 64 in the direction A1. The first portion 62a connects to (communicates with) the second portion 62b at a position between the distal end 52 of the sleeve 50 and the distal end 64. The first portion 62a has an inner diameter that is greater than an outer diameter of the outer peripheral surface 53 of the sleeve 50 and that is substantially equal to an outer diameter of the outer peripheral surface 44 of the metal member 40. The second portion 62b has an inner diameter that is smaller than the outer diameter of the outer peripheral surface 44 of the metal member 40 and slightly greater than an inner diameter of the inner peripheral surface 54 of the sleeve 50. Because the inner diameter of the first portion 62a is greater than the inner diameter of the second portion 62b as described above, a shoulder surface 65 is formed between the first portion 62a and the second portion 62b. The shoulder surface 65 faces the distal end 52 of the sleeve 50.

The following describes effects achieved by the optical receptacle 1A and the fiber stub 2A in the first embodiment having the configurations described above. The fiber stub 2A has a structure in which the ferrule 10 holds the optical fiber 11 therein. The optical receptacle 1A has a structure in which the metal member 40 holds the fiber stub 2A in the through hole 41. The structure of the optical receptacle 1A may be regarded as a cylindrical waveguide including composite dielectrics (ferrule 10 and optical fiber 11) filling the through hole 41 in the metal member 40. The waveguide has a cutoff frequency and cuts off electromagnetic waves having frequencies equal to or lower than the cutoff frequency. A high dielectric constant of the dielectric material filling the waveguide decrease the cutoff frequency, so that the electromagnetic waves having high frequencies tend to pass through the waveguide. Zirconia has a particularly high relative permittivity of 33 to 46, about ten times higher than a relative permittivity of 3.8 of quartz. This can decrease the cutoff frequency of the cylindrical waveguide. Consider a case in which a cylindrical waveguide having an inner diameter of 1.25 mm is filled with zirconia (relative permittivity 33). The cutoff frequency is calculated in this case as 24.47 GHz. Meanwhile, the baud rate of 100G Base-Lx specified by IEEE 802.3 as a current mainstream standard of optical communication is 25.78125 Gb/s. Thus, for example, a second harmonic component of a clock frequency is higher than the above cutoff frequency, so that leakage of electromagnetic waves can occur in the optical receptacle including the traditional fiber stub.

To solve the foregoing problem, in the optical receptacle 1A in the first embodiment, the fiber stub 2A includes the ferrule 10 and the low dielectric constant material 30 disposed inside the ferrule 10. The ferrule 10, having the distal end face 10b, makes a physical contact with the optical connector ferrule. Thus, a material having a high toughness and high Young's modulus (e.g., zirconia as a high dielectric constant material) is used as the material for the ferrule 10. Meanwhile, the low dielectric constant material 30 has a dielectric constant lower than the dielectric constant of the ferrule 10. Examples of materials used for the low dielectric constant material 30 include, but are not limited to, a resin. The cutoff frequency of the waveguide formed by the metal member 40 in which the fiber stub 2A is press-fitted is thus increased by the low dielectric constant material 30, so that the electromagnetic waves having high frequencies tend not to pass through the waveguide formed by the metal member 40 in which the fiber stub 2A is press-fitted. Specifically, the optical receptacle 1A having the foregoing waveguide structure can mitigate degradation of the electromagnetic compatibility which the traditional fiber stub barely prevents.

In the optical receptacle 1A, the ferrule 10 further has the bore 22 formed in the proximal end face 10a and the low dielectric constant material 30 may be formed by a material having a dielectric constant lower than that of the ferrule 10, filling the bore 22 outside the optical fiber 11. This configuration enables easy manufacturing of the fiber stub 2A that includes the ferrule 10 including the low dielectric constant material 30 disposed thereinside.

When the bore 22 is deeper from the proximal end 10a, the low dielectric constant material 30 is longer in length in the direction A1, so that the electromagnetic waves having high frequencies can be more effectively attenuated and shielded. When the fiber stub 2A is press-fitted in the metal member 40, however, a press-fit portion of the fiber stub 2A is required to have a sufficient strength (breakage resistance). Forming the bore 22 by counterboring the proximal end face of the ferrule may cause the material of the ferrule to be fragile with respect to stress to be received when the ferrule is press-fitted into the metal member 40. Thus, stringent control of machining dimensions is required in order to reduce variations in stress occurring in press-fitting. The depth of the bore 22 may therefore be smaller than the length of the press-fit portion (length of the contact range C).

In the optical receptacle 1A, in order to effectively shield the electromagnetic waves having high frequencies, while maintaining a sufficient strength for the portion of the fiber stub 2A press-fitted in the metal member 40, the bore 22 may include the taper 22b having an inner diameter decreasing toward the bottom 22c. The bore 22 can thus be made practically even deeper. The dielectric constant of the fiber stub 2A can thus be reduced while the strength of the ferrule 10 can be prevented from being reduced, so that the electromagnetic waves having high frequencies can be effectively shielded. For example, a configuration is possible in which the bottom 22c of the bore 22 is located to be closer to the distal end face 10b than is an end closer to the distal end face 10b of the contact range C between the fiber stub 2A and the through hole 41 in the direction A1.

The inner diameter L1 of the bore 22 in the optical receptacle 1A may be 0.4 times or more to 0.5 times or less the outer diameter L2 of the fiber stub 2A. Alternatively, because the outer diameter L2 of the fiber stub 2A is determined based at least in part on (or equal to the outer diameter of) the ferrule 10, the inner diameter L1 of the bore 22 may be 0.4 times or more to 0.5 times or less the outer diameter of the ferrule 10. As will be described in the example to be described later, when the inner diameter L1 of the bore 22 and the outer diameter L2 of the fiber stub 2A have the relation described above, the electromagnetic waves having frequencies close to 25 GHz used for high speed optical communication and higher can be effectively shielded.

In the optical receptacle 1A, the ferrule 10 may be formed of zirconia and the low dielectric constant material 30 may be formed of a resin. Such arrangements can favorably achieve the ferrule 10 that makes a physical contact with the optical connector ferrule and the low dielectric constant material 30 for increasing the cutoff frequency of the waveguide by reducing the dielectric constant of the fiber stub 2A.

Figure 7:
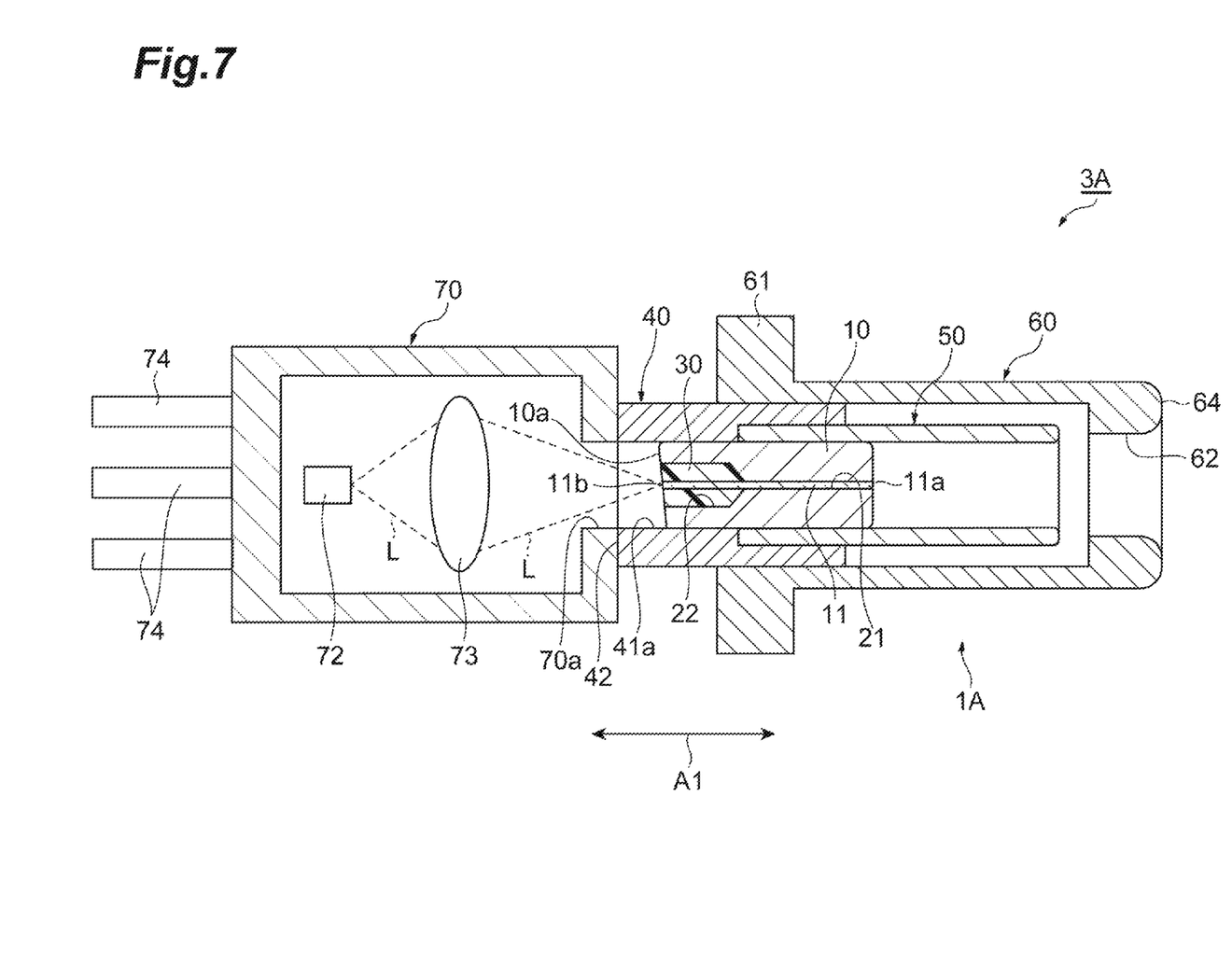
FIG. 7 is a sectional view illustrating a configuration of an optical module according to a second embodiment.

FIG. 7 is a sectional view illustrating a configuration of an optical module 3A according to a second embodiment and shows the sectional view corresponding to in FIG. 4. As illustrated in FIG. 7, the optical module 3A in the second embodiment includes the optical receptacle 1A in the first embodiment, an optical device 72, a lens 73, and a package 70. The optical device 72 optically couples to the second end 11b of the optical fiber 11 via the lens 73. The optical device 72 is an active element such as a light-receiving element or a light-emitting element. The light-receiving element is a photodiode, for example. The light-emitting element is a semiconductor laser element like a laser diode, for example. The lens 73 is disposed in an optical path between the second end 11b of the optical fiber 11 and the optical device 72. The package 70 is fixed to at least either one of the metal member 40 and the shell (metal body) 60 and houses the optical device 72 and the lens 73. In one example, the package 70 is fixed to the proximal end face 42 of the metal member 40. The package 70 is formed of metal for electromagnetic shielding for the optical device 72. The proximal end face 42 of the metal member 40 is joined to a first end face of the package 70 by welding, for example. The package 70 has an opening 70a in the first end face. The opening 70a allows signal light L to pass therethrough. The opening 70a communicates with the first portion 41a of the through hole 41 in the metal member 40. A plurality of lead terminals 74 protrude from a second end face of the package 70. The lead terminals 74 provide an electric connection with an external device.

When the optical device 72 is a light-receiving element, the signal light L that has undergone high-speed modulation and that has arrived at the second end 11b of the optical fiber 11 from an optical connector connected with the optical receptacle 1A is emitted from the second end 11b and focused by the lens 73 onto a light-receiving face of the optical device 72. The optical device 72 generates an electric signal corresponding to strength of the signal light L incident thereupon. The electric signal is output to the outside of the optical module 3A by way of either one of the lead terminals 74. When the optical device 72 is a light-emitting element, the optical device 72 receives a high-speed modulated electric signal via either one of the lead terminals 74 and emits a signal light L corresponding to the electric signal. The signal light L is focused by the lens 73 onto the second end 11b of the optical fiber 11 and travels through the optical fiber 11. The signal light L that has arrived at the first end 11a of the optical fiber 11 is transmitted to the optical connector connected with the optical receptacle 1A.

The optical module 3A, including the optical receptacle 1A in the first embodiment, can mitigate degradation of electromagnetic compatibility which the traditional fiber stub barely prevents. Specifically, although the electromagnetic shielding for the optical device 72 is provided by the metal package 70 in the optical module 3A, the electromagnetic waves can pass through the opening 70a and the through hole 41. Thus, the structure of the first embodiment is applied to the fiber stub 2A disposed in the through hole 41. This arrangement allows the electromagnetic shield for the optical device 72 to be improved and detection accuracy or output power accuracy of the signal light L to be enhanced.

Example

Figure 8:
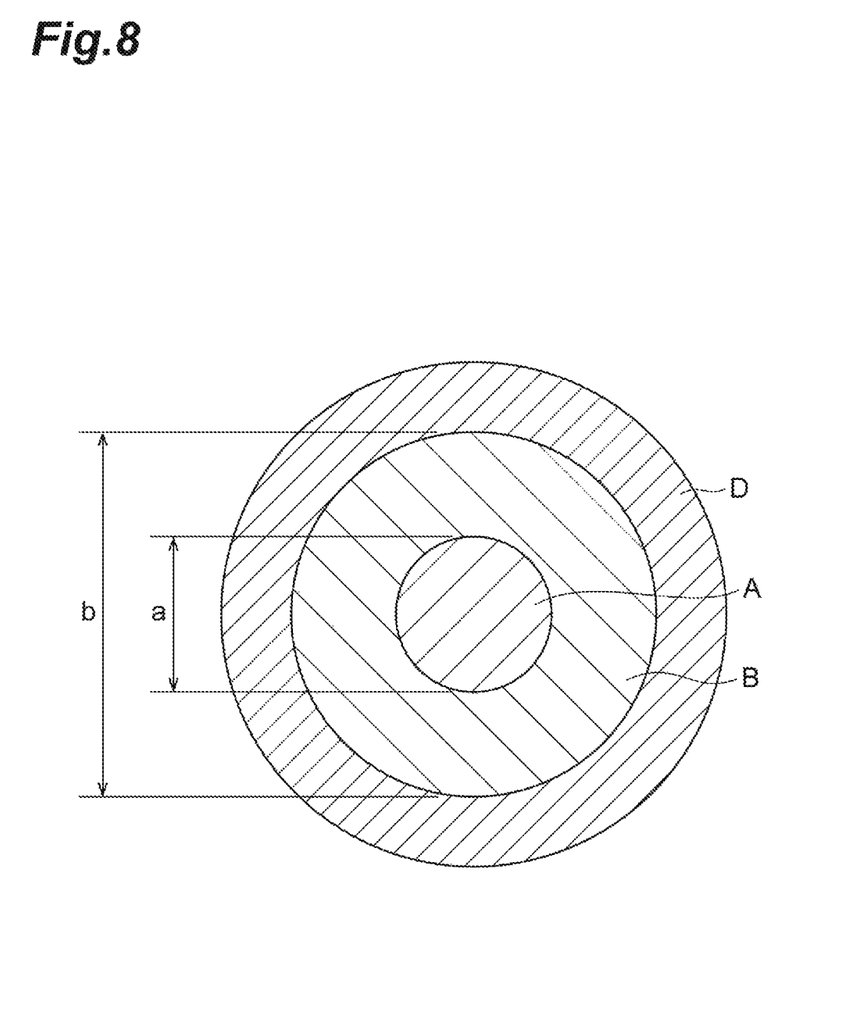
FIG. 8 is a cross-sectional view of a calculation model in an example.

The following describes calculations of propagation characteristics of electromagnetic waves for a configuration including a region A and a region B disposed inside a cylindrical waveguide D as illustrated in FIG. 8. The region A has a circular cross section (diameter a) having certain relative permittivity $\varepsilon_1$. The region B is disposed to surround the region A and has an annular cross section (diameter b) having certain relative permittivity $\varepsilon_2$. The region A corresponds to the low dielectric constant material 30 and the optical fiber 11 in the first embodiment. The region B corresponds to the ferrule 10 in the first embodiment. Assume that the frequency of the electromagnetic wave is 25 GHz and b=1.25 mm=0.102 $\lambda_1$ (where, $\lambda_1$ is a wavelength of the electromagnetic wave). Assume also that $\varepsilon_2$=10 $\varepsilon_1$. For example, zirconia in a first region 20 has relative permittivity (33 to 46), about ten times higher than the relative permittivity (3.8) of quartz of the optical fiber 11.

Figure 9:
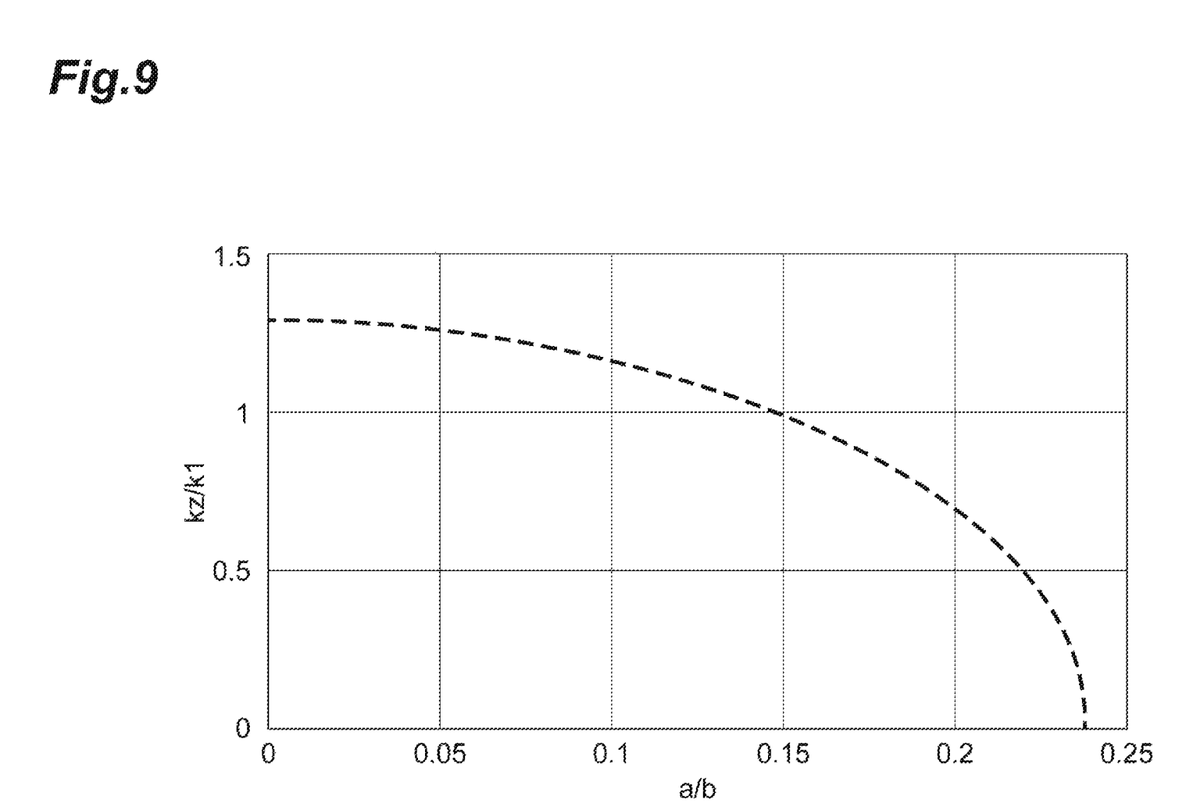
FIG. 9 is a graph illustrating calculations of a correlation between a propagation constant of an electromagnetic wave in the calculation model illustrated in FIG. 8 and a ratio of diameters of a low dielectric constant region.

FIG. 9 is a graph illustrating calculations of a correlation between a propagation constant kz of the electromagnetic wave in the calculation model illustrated in FIG. 8 and a ratio (a/b) of the diameter a to the diameter b. The abscissa represents the ratio (a/b) and the ordinate represents a value (kz/k1) of the propagation constant kz divided by a wave number k1. As illustrated in FIG. 8, the value (kz/k1) increases with a decreasing ratio (a/b), indicating that the electromagnetic wave is easier to propagate at smaller ratios (a/b). For example, when the ratio (a/b) is 0.1 (specifically, for the traditional fiber stub including the region A formed of only the optical fiber 11), the value (kz/k1) exceeds 1.2 and the electromagnetic wave of 25 GHz is easier to pass through the fiber stub. In contrast, when the ratio (a/b) exceeds 0.1 (specifically, for the fiber stub 2A in the first embodiment, including the region A formed of the optical fiber 11 and the low dielectric constant material 30), the value (kz/k1) decreases with an increasing ratio (a/b), so that the electromagnetic wave of 25 GHz is harder to pass through the fiber stub 2A. When (a/b)=0.238, in particular, (kz/k1) is zero and no electromagnetic waves of 25 GHz propagate (theoretically, the electromagnetic waves are completed shielded).

Figure 10:
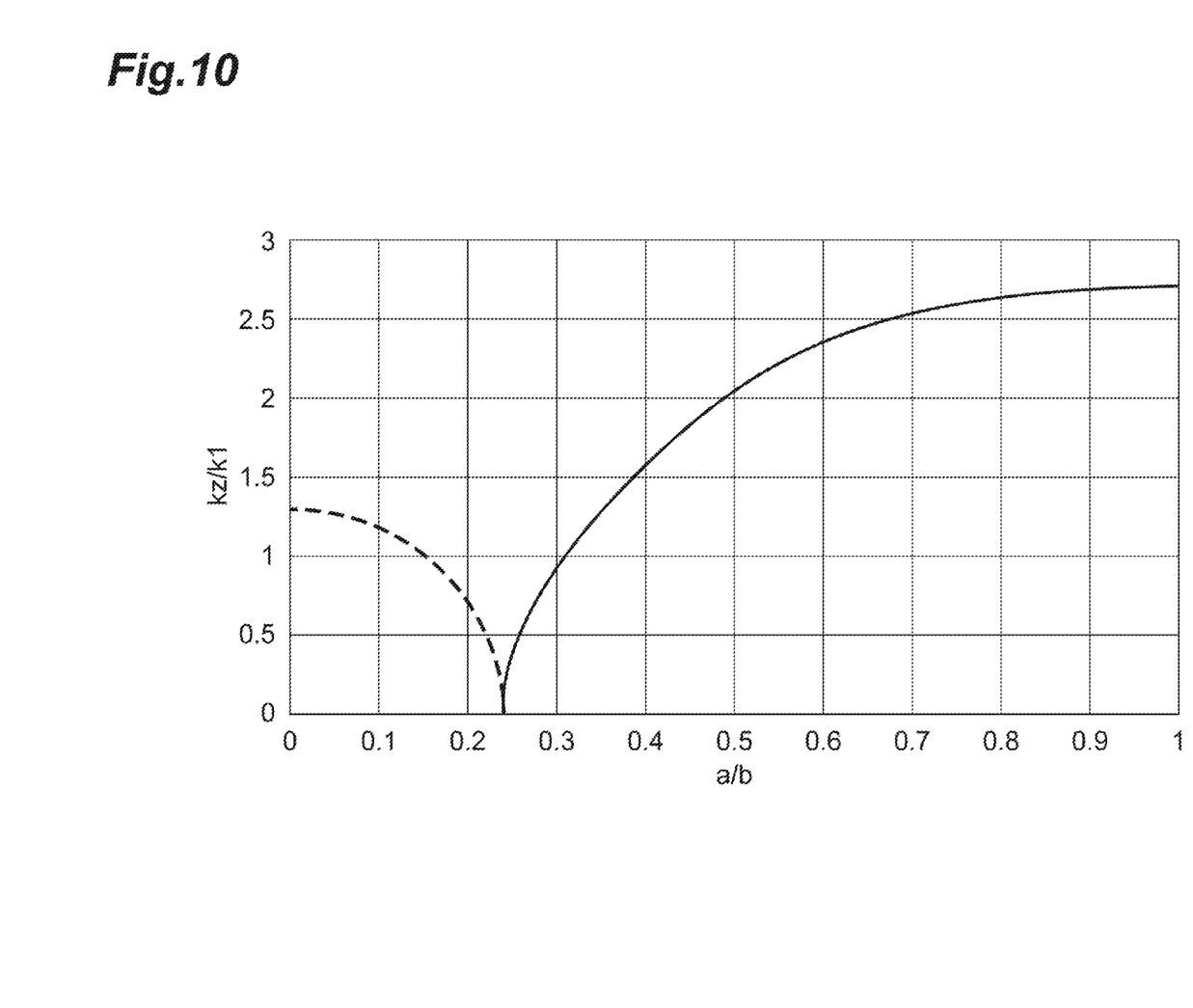
FIG. 10 is a graph illustrating, in addition to the calculations of the correlation between the propagation constant of the electromagnetic wave in the calculation model illustrated in FIG. 8 and the ratio of diameters of the low dielectric constant region, a range over which the propagation constant is imaginary.

FIG. 10 is a graph that additionally includes a range over which the ratio (a/b) is greater than 0.238 (specifically, range over which the propagation constant kz is imaginary (imaginary kz is referred to as an attenuation constant)). As illustrated in FIG. 10, the propagation constant kz increases and an attenuation amount of the electromagnetic wave of 25 GHz increases with an increasing ratio (a/b). Thus, the electromagnetic wave of 25 GHz can be more effectively shielded by setting a value greater than 0.238 for the ratio (a/b). The attenuation amount of the electromagnetic wave depends also on a longer length of the region A in a direction in which the electromagnetic wave propagates (specifically, the length of a second region 30 in the direction A1). For example, the attenuation amount of the electromagnetic wave increases with an increasing length of the region A, so that the electromagnetic wave of 25 GHz can be further prevented from being radiated outside the optical receptacle 1A through the fiber stub 2A.

In FIG. 10, (kz/k1) is about 2 when the ratio (a/b) is 0.5. In this case, assuming that the region A is 0.9 mm long, the electromagnetic wave of 25 GHz is attenuated by about 16 dB while passing through the cylindrical waveguide D. As indicated by the graph of FIG. 10, when the ratio (a/b) is equal to or higher than 0.4 and equal to or lower than 0.5, the electromagnetic wave of 25 GHz is attenuated by 12 dB or more and a sufficient electromagnetic wave shielding effect can be achieved. An even more remarkable shielding effect can be achieved with the ratio (a/b) exceeding 0.5; however, there is apprehension that the strength of the ferrule 10 is reduced by increasing the volume of the bore 22. The bore 22, even filled with a resin, for example, has a considerably reduced strength compared with zirconia in the ferrule 10. Thus, preferably, the ratio (a/b) is equal to or higher than 0.4 and equal to or lower than 0.5. With the fiber stub 2A in the first embodiment, preferably, the inner diameter L1 of the bore 22 is 0.4 times or more to 0.5 times or less the outer diameter L2 of the fiber stub 2A (or ferrule 10).

The optical receptacle, the fiber stub, and the optical module according the embodiments of the present invention described above are illustrative only and not limiting and various modifications may be made. For example, in FIG. 6, the taper 22b has a conical inner surface shape (the section along the central axis is defined by linear segments). The taper is nonetheless required only to have the inner diameter gradually decreasing toward the bottom. For example, the taper may have a semispherical inner surface (the section along the central axis is defined by curved segments). Zirconia as an exemplary material for the ferrule 10 and a resin as an exemplary material for the low dielectric constant material 30 in the embodiments are illustrative only and not limiting. In the embodiments described above, the bore 22 is formed in the proximal end face 10a of the ferrule 10 and the low dielectric constant material 30 is disposed inside the bore 22. The low dielectric constant material may nonetheless be disposed inside the ferrule or in a bore formed in the outer peripheral surface of the ferrule.

What is claimed is:

1. An optical receptacle comprising:
    a fiber stub including a ferrule, an optical fiber, and a resin, the resin having a dielectric constant lower than a dielectric constant of the ferrule, the ferrule having a distal end face and a proximal end face opposite to the distal end face, the distal end face having an inner hole, the proximal end face having a bore connected to the inner hole inside the ferrule, the optical fiber being guided from the proximal end face to the distal end face through the bore and the inner hole, the resin being formed inside the bore and outside the optical fiber, the bore having a diameter larger than a diameter of the inner hole;
    a metal member that has a first through hole and holds the fiber stub in the first through hole; and
    a metal body that has a second through hole and holds the metal member in the second through hole.

2. The optical receptacle according to claim 1, wherein the bore outside the optical fiber is filled with the resin.

3. The optical receptacle according to claim 1, wherein the inner hole runs through from a bottom of the bore to the distal end face of the ferrule.

4. The optical receptacle according to claim 1, wherein the ferrule includes a taper as a portion of the bore, and the taper has an inner diameter gradually decreasing toward a bottom of the bore.

5. The optical receptacle according to claim 4, wherein the ferrule further includes a main hole as another portion of the bore, the main hole has a round columnar shape, and the main hole extends from the proximal end face to the taper.

6. The optical receptacle according to claim 1, wherein the ferrule is press-fitted in the first through hole, and the bore has a bottom located closer to the distal end face than an end, closer to the distal end face, of a contact range between the ferrule and the first through hole.

7. The optical receptacle according to claim 1, wherein the bore has an inner diameter that is 0.5 times or less an outer diameter of the ferrule.

8. The optical receptacle according to claim 1, wherein the bore has an inner diameter that is 0.4 times or more an outer diameter of the ferrule.

9. The optical receptacle according to claim 1, wherein the proximal end face is inclined with respect to a plane perpendicular to an axial direction of the optical fiber.

10. The optical receptacle according to claim 1, wherein the ferrule is formed of zirconia.

11. The optical receptacle according to claim 1, wherein the resin includes an epoxy resin.

12. The optical receptacle according to claim 1, wherein the resin has a certain relative permittivity so that the optical receptacle has a cutoff frequency more than 25 GHz.

13. An optical module, comprising:
    the optical receptacle according to claim 1;
    an optical device that optically couples with a second end of the optical fiber;
    a lens disposed in an optical path between the second end of the optical fiber and the optical device; and
    a package attached to at least one of the metal member or the metal body, the package housing the optical device and the lens therein.

* * * * *